US012567054B2

(12) United States Patent
Pezewski et al.

(10) Patent No.: US 12,567,054 B2
(45) Date of Patent: Mar. 3, 2026

(54) SYSTEMS AND METHODS FOR EXECUTING ELECTRONIC TRANSACTIONS AND FILTERING WITH CATEGORIZATION ENGINE

(71) Applicant: Fidelity Information Services, LLC, Jacksonville, FL (US)

(72) Inventors: Alois L. Pezewski, Milwaukee, WI (US); Ganesh Kumar Gunasekaran, Toronto (CA); Smitha Prasad, Milwaukee, WI (US); Venkateswaran Sekharipuram Subramanian, Milwaukee, WI (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 17/340,426

(22) Filed: Jun. 7, 2021

(65) Prior Publication Data

US 2022/0391874 A1 Dec. 8, 2022

(51) Int. Cl.
*G06Q 20/26* (2012.01)
*G06Q 20/28* (2012.01)
*G06Q 20/34* (2012.01)
*G06Q 20/36* (2012.01)

(52) U.S. Cl.
CPC ........... *G06Q 20/26* (2013.01); *G06Q 20/348* (2013.01); *G06Q 20/36* (2013.01)

(58) Field of Classification Search
CPC ....... G06Q 20/26; G06Q 20/348; G06Q 20/36
USPC .......................................................... 705/39
See application file for complete search history.

(56) References Cited

U.S. PATENT DOCUMENTS

| | | | |
|---|---|---|---|
| 7,945,512 B2 * | 5/2011 | Scipioni | G06Q 20/105 705/30 |
| 2006/0151598 A1 * | 7/2006 | Chen | G06Q 20/20 235/379 |
| 2011/0078011 A1 * | 3/2011 | Senghore | G06Q 30/0219 705/14.27 |
| 2011/0078032 A1 * | 3/2011 | Johnson | G06Q 20/3555 705/16 |
| 2019/0205993 A1 * | 7/2019 | Rodriguez | H04L 67/535 |

* cited by examiner

*Primary Examiner* — Clifford B Madamba
(74) *Attorney, Agent, or Firm* — Bookoff McAndrews, PLLC

(57) ABSTRACT

Systems and methods for executing filtered electronic transactions are disclosed. One method includes receiving, by an acquirer system of a filtered transaction processing system, a transaction request including transaction data from a merchant system, the transaction data including enhanced data or non-enhanced data. A status of the merchant system may be determined based on the transaction data, the status of the merchant system indicative of a participating status or a non-participating status. Upon determining the status of the merchant system indicative of the participating status, the transaction request may be transmitted to a first transaction network. The first transaction network may forward the transaction request to a categorization engine of the filtered transaction processing system. The categorization engine may categorize one or more items associated with the transaction request into one or more categories. The transaction request may be executed based on the one or more categories.

14 Claims, 5 Drawing Sheets

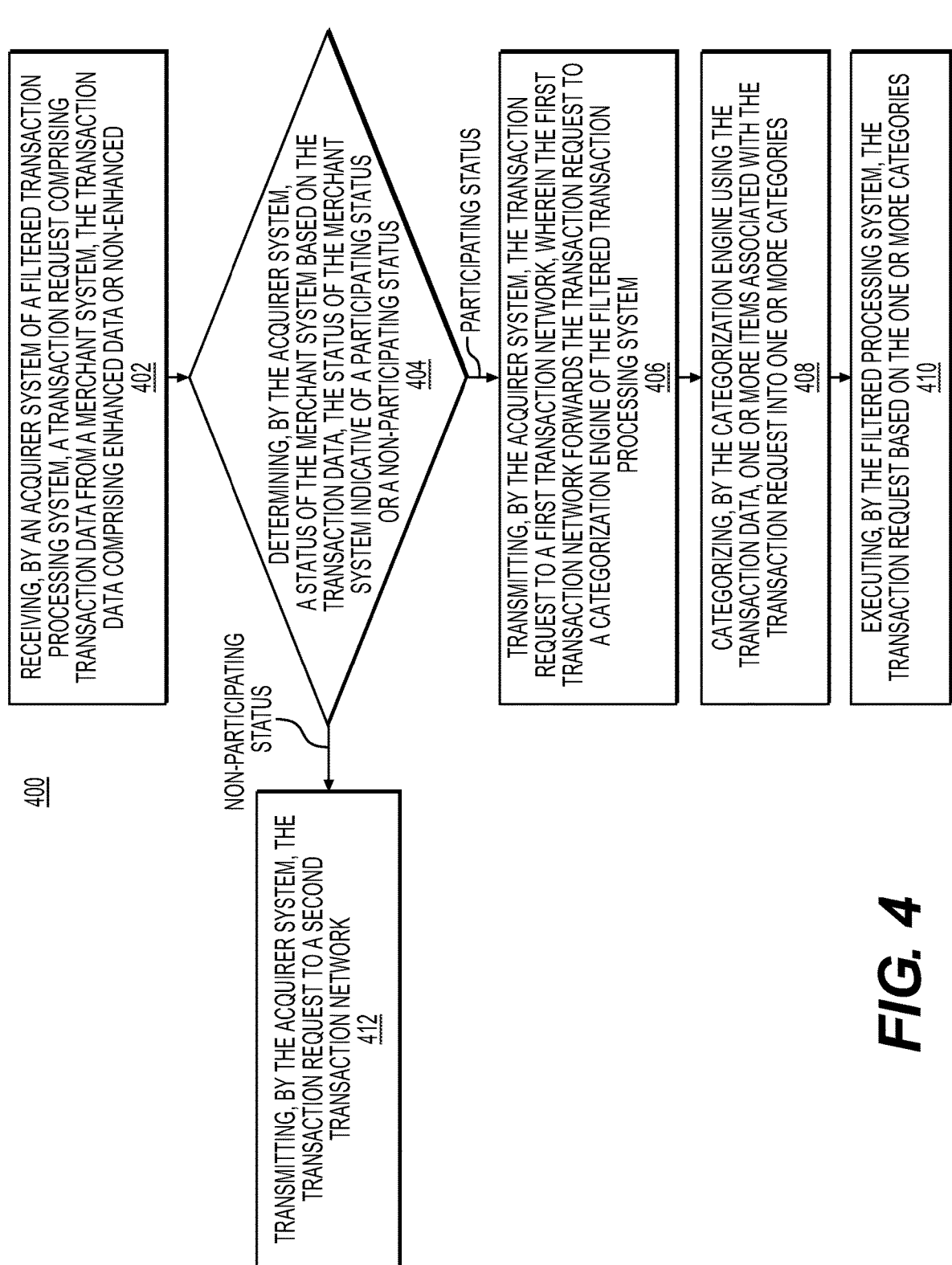

400

RECEIVING, BY AN ACQUIRER SYSTEM OF A FILTERED TRANSACTION PROCESSING SYSTEM, A TRANSACTION REQUEST COMPRISING TRANSACTION DATA FROM A MERCHANT SYSTEM, THE TRANSACTION DATA COMPRISING ENHANCED DATA OR NON-ENHANCED DATA
402

DETERMINING, BY THE ACQUIRER SYSTEM, A STATUS OF THE MERCHANT SYSTEM BASED ON THE TRANSACTION DATA, THE STATUS OF THE MERCHANT SYSTEM INDICATIVE OF A PARTICIPATING STATUS OR A NON-PARTICIPATING STATUS
404

NON-PARTICIPATING STATUS

PARTICIPATING STATUS

TRANSMITTING, BY THE ACQUIRER SYSTEM, THE TRANSACTION REQUEST TO A FIRST TRANSACTION NETWORK, WHEREIN THE FIRST TRANSACTION NETWORK FORWARDS THE TRANSACTION REQUEST TO A CATEGORIZATION ENGINE OF THE FILTERED TRANSACTION PROCESSING SYSTEM
406

CATEGORIZING, BY THE CATEGORIZATION ENGINE USING THE TRANSACTION DATA, ONE OR MORE ITEMS ASSOCIATED WITH THE TRANSACTION REQUEST INTO ONE OR MORE CATEGORIES
408

EXECUTING, BY THE FILTERED PROCESSING SYSTEM, THE TRANSACTION REQUEST BASED ON THE ONE OR MORE CATEGORIES
410

TRANSMITTING, BY THE ACQUIRER SYSTEM, THE TRANSACTION REQUEST TO A SECOND TRANSACTION NETWORK
412

*FIG. 4*

SYSTEMS AND METHODS FOR EXECUTING ELECTRONIC TRANSACTIONS AND FILTERING WITH CATEGORIZATION ENGINE

TECHNICAL FIELD

The present disclosure relates generally to the field of electronic transactions and, more particularly, to systems and methods for executing filtered electronic transactions.

BACKGROUND

Various businesses and institutions offer prepaid benefits (or funds) to their beneficiaries. For example, insurance companies, manufacturers, general retailers, unions, post-secondary schools (e.g., trade schools, tech schools, etc.), government programs (e.g., Supplemental Nutrition Assistance Program (SNAP), Special Supplemental Nutrition Program for Women, Infants, and Children (WIC), farmers markets, Medicaid/Medicare, etc.), social programs (e.g., social security, child support, housing programs, etc.), disaster relief programs, etc. may each provide prepaid benefits to encourage using their prepaid services. One example of such prepaid service or system is Electronic Benefits Transfer (EBT). EBT is an electronic system that allows benefit recipients to request transfer of government benefits from a Federal account to a retailer account to pay for products purchased.

A broad range of businesses and institutions continue to seek ways to encourage spending or purchasing particular product items. However, conventional electronic payment/fund transaction technology may lack the ability to conveniently track, analyze, and/or categorize preapproved product items associated with various prepaid benefits programs. The present disclosure is directed to addressing these and other drawbacks to the existing electronic transaction systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method of executing filtered electronic transactions, comprising: receiving, by an acquirer system of a filtered transaction processing system, a transaction request comprising transaction data from a merchant system, the transaction data comprising enhanced data or non-enhanced data; determining, by the acquirer system, a status of the merchant system based on the transaction data, the status of the merchant system indicative of a participating status or a non-participating status; upon determining the status of the merchant system indicative of the participating status, transmitting, by the acquirer system, the transaction request to a first transaction network, wherein the first transaction network forwards the transaction request to a categorization engine of the filtered transaction processing system; categorizing, by the categorization engine using the transaction data, one or more items associated with the transaction request into one or more categories; and executing, by the filtered transaction processing system, the transaction request based on the one or more categories.

One embodiment provides a filtered transaction processing system comprising: one or more computer readable media storing instructions for executing filtered electronic transactions; and one or more processors configured to execute the instructions to perform operations comprising: receiving, by an acquirer system of a filtered transaction processing system, a transaction request comprising transaction data from a merchant system, the transaction data comprising enhanced data or non-enhanced data; determining, by the acquirer system, a status of the merchant system based on the transaction data, the status of the merchant system indicative of a participating status or a non-participating status; upon determining the status of the merchant system indicative of the participating status, transmitting, by the acquirer system, the transaction request to a first transaction network, wherein the first transaction network forwards the transaction request to a categorization engine of the filtered transaction processing system; categorizing, by the categorization engine using the transaction data, one or more items associated with the transaction request into one or more categories; and executing, by the filtered transaction processing system, the transaction request based on the one or more categories.

One embodiment provides a non-transitory computer-readable medium storing instructions for executing filtered electronic transactions, the instructions, when executed by one or more processors, causing the one or more processors to perform operations comprising: receiving, by an acquirer system of a filtered transaction processing system, a transaction request comprising transaction data from a merchant system, the transaction data comprising enhanced data or non-enhanced data; determining, by the acquirer system, a status of the merchant system based on the transaction data, the status of the merchant system indicative of a participating status or a non-participating status; upon determining the status of the merchant system indicative of the participating status, transmitting, by the acquirer system, the transaction request to a first transaction network, wherein the first transaction network forwards the transaction request to a categorization engine of the filtered transaction processing system; categorizing, by the categorization engine using the transaction data, one or more items associated with the transaction request into one or more categories; and executing, by the filtered transaction processing system, the transaction request based on the one or more categories.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 4 depicts a flowchart illustrating an exemplary method of executing a filtered transaction, according to one aspect of the present disclosure.

DETAILED DESCRIPTION OF EMBODIMENTS

Figure 1:
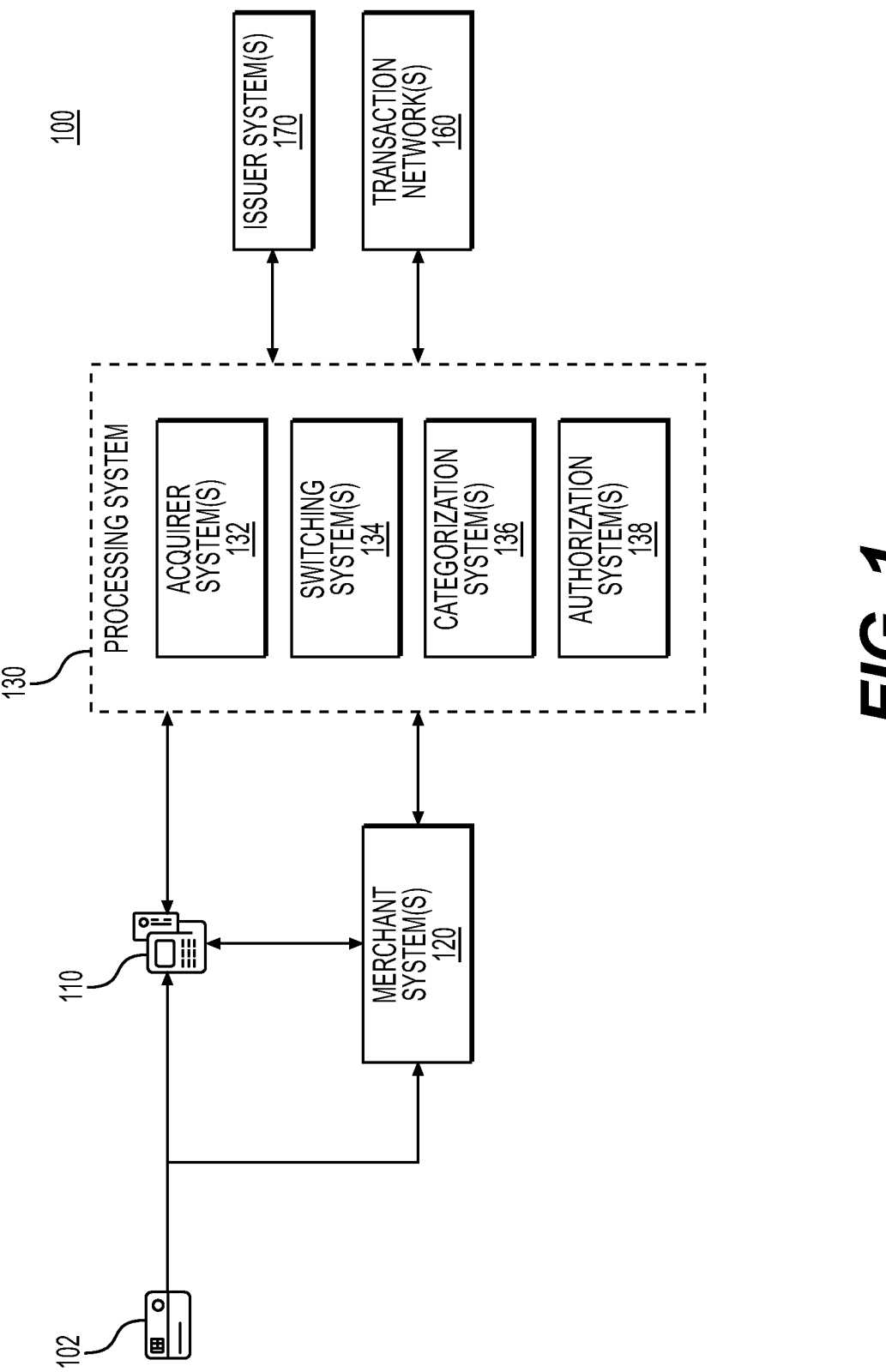
FIG. 1 depicts a block diagram of an exemplary filtered transaction system, according to one aspect of the present disclosure.

The following embodiments describe systems and methods for facilitating filtered electronic transactions. More particularly, the embodiments contemplated in the present disclosure may enable merchants and customers to utilize a filtered transaction process or service provided by a processing system, which may be configured to execute filtered payment transactions associated with a filtered payment vehicle.

As discussed above, the conventional prepaid benefit (or funds) payment systems may lack the ability to conveniently track, analyze, and/or allocate preapproved product items. To address these problems, the present disclosure describes systems and methods that provide a filtered transaction process (e.g., a prepaid program or service) that may allow consumers (or participating members) to purchase filtered items (e.g., prepaid qualified items or products) from participating entities (e.g., a merchant, a bank, a company, a government agency, etc.) with prefunded card (or account) balances. The filtered transaction process of this disclosure may utilize an Approved Product List (APL) to determine products that may be eligible for filtered spending, such as, for example, over the counter medications, healthy foods, etc. In one embodiment, funds specific to the APL may be added to the prepaid card as a "purse" to enable the cardholders to shop at participating retailers or merchants and purchase preapproved filtered items. Additionally, during a purchase transaction of a filtered item, the Stock Keeping Unit (SKU) of the filtered item may be assessed in real-time, determining whether each item may be eligible or ineligible. If an item is determined to be eligible, a corresponding transaction amount may be subtracted from (i.e., debited to) a purse associated the APL. Items that may not be eligible may either be charged to a generic spending purse on that same card or may be declined. The filtered transaction process of this disclosure may offer clients such as employers, consumer brands, healthcare, or insurance companies the means to encourage their beneficiaries to spend for specific items. The beneficiaries (or cardholders) may simply use their prepaid cards (e.g., filtered transaction cards) to purchase items, for example, over the counter medications (e.g., cough syrup, aspirin, bandages, etc.) as part of a corporate benefit, consumer brand incentive, and the like. Other use cases may include specific health food options, allowing the cardholders to receive discounts on specific purchases contributing to overall health.

In one or more embodiments, the present disclosures describe systems and methods that execute filtered transactions with a categorization engine. In one embodiment, a filtered processing system may receive transaction data associated with a purchase transaction of a payment vehicle (e.g., filtered transaction card) from a merchant. The transaction data may include enhanced data or non-enhanced data. In one embodiment, the payment vehicle may include at least one of a prefunded credit card or an Electronic Benefits Transfer (EBT) card. The filtered processing system may detect a participating status of the merchant system. If the merchant is a participant of the filtered spending program or service, the filtered processing system may transmit the transaction data with enhanced transaction data to a primary transaction network. If the merchant is not a participant of the filtered pending program, the filtered processing system may transmit the transaction data with non-enhanced transaction data to a secondary transaction network.

In one embodiment, the filtered processing system may transmit the transaction request of the payment vehicle to a categorization engine (e.g., categorization engine 238) of the filtered processing system. The categorization engine may categorize one or more purchase items associated with the transaction request of the payment vehicle into one or more categories. Further, the categorization engine may categorize the one or more purchase items of the transaction request based at least on one or more APLs stored in a database (e.g., APL database 236). The one or more categories may include at least one of a medical expenditure, a food expenditure, an excluded expenditure, or an unknown expenditure. In one embodiment, the categorization engine may determine whether the one or more purchase items of the transaction request are eligible for filtered spending at least based on one or more APLs stored in the database of the filtered processing system in real-time. The filtered transaction system may then complete the transaction request of the payment vehicle based on the one or more categories. In one embodiment, the filtered transaction system may execute the transaction request of the payment vehicle with at least one of an APL fund or a generic spending fund based at least on the categorization of the one or more items of the transaction request.

It should be appreciated that particular consideration is made herein to prepaid card transactions (or filtered transactions) due to the prevalence of these transactions. Despite this reference to prepaid cards, certain disclosed systems and methods may apply equally well to other payment vehicles (e.g., an EBT card, credit card, debit card, gift card, loyalty card, bonus points card, contactless payment device, digital payment device, digital wallet, etc.), whether "card present" or "card not present" (CNP). Disclosed systems and methods may apply, for example, in online transactions where a user is not physically present at a merchant location. Transactions may include EBT online transactions, EBT card transactions, debit or credit card transactions, gift card transactions, cryptocurrency transactions, smart card transactions, mobile application transactions, and transactions involving loyalty cards, to name a few. Further, while the party seeking to initiate a payment transaction and/or provide a third-party service may be referred to herein as a "merchant," a party seeking to initiate a payment transaction need not be a merchant, but may be a service provider, or any party seeking to execute a transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary system 100 including a point of service (POS) terminal 110, merchant system(s) 120, and a processing system 130 (i.e., a filtered transaction processing system 130), which is in communication with the POS terminal 110, the merchant system(s) 120, transaction network(s) 160, and issuer system(s) 170. The POS terminal 110 may be a traditional stand-beside POS, an electronic cash register (ECR), or a mobile device (e.g., a tablet, laptop, smartphone, etc.). The POS terminal 110 may collect transaction data (e.g., purchase transaction data) associated with a transaction vehicle 102 (e.g., a EBT card, credit card, debit card, gift card, loyalty card, bonus points card, contactless payment device, digital payment device, digital wallet, etc.) upon a user (e.g., a customer, a beneficiary, etc.) submitting the transaction vehicle 102 at the POS terminal 110, and may transfer the transaction data associated with the transaction vehicle 102 to the merchant system(s) 120 and/or the processing system 130. Additionally or alternatively, the merchant system(s) 120 may collect, via an online or offline interface, the transaction data associated with the transaction vehicle 102 and transmit the transaction data to the processing system 130 or the acquirer system(s) 132 therein. The processing system 130, or the acquirer system(s) 132, may communicate with the issuer system(s) 170 and the transaction network(s) 160 to execute one or more transactions based on the received transaction data.

In one embodiment, the transaction vehicle 102 may be a filtered transaction vehicle. A filtered transaction vehicle may be, for example, an EBT card, a credit card, a debit card, a gift card, a loyalty card, a bonus points card, a contactless payment device, a digital payment device, a digital wallet, etc. A filtered transaction vehicle may be used at any location, for example, brick-and-mortar stores, online e-commerce websites, e-commerce apps, etc., where the filtered transaction vehicle's sponsoring networks (e.g., EBT, New York Currency Exchange (NYCE), Visa, MasterCard, Discover, American Express, other regional networks, etc.) may be accepted. In one embodiment, a user account associated with a filtered transaction vehicle may be funded by a participating entity (e.g., a merchant, a bank, a company, a government agency, etc.). A filtered transaction vehicle of this disclosure may be used at one or more merchant stores, online websites, or apps that may be associated with the filtered transaction vehicle issued by one or more participating entities. A filtered transaction vehicle may include functionality and aspects of both a filtered transaction vehicle and a non-filtered transaction vehicle (e.g., a standard credit or debit card). That is, a filtered transaction vehicle may be used anywhere the filtered transaction vehicle or standard credit or debit card may be accepted.

Still referring to FIG. 1, in one embodiment, the POS terminal 110 may be a standalone filtered transaction terminal (e.g., a standalone EBT terminal) or other POS terminals that may be configured to accept filtered transaction vehicles. For example, a participating merchant may utilize an integrated POS terminal by using a third-party POS terminal that may be connected through a gateway to facilitate communication with the acquirer system(s) 132.

The POS terminal 110 may communicate with the merchant system(s) 120 to execute electronic transactions (e.g., purchase transactions) associated with the transaction vehicle 102. Additionally or alternatively, the POS terminal 110 may communicate directly with the processing system 130 to execute the electronic transactions of this disclosure. The merchant system(s) 120 may include a payment terminal (e.g., a "pin pad"), or, a data server, for example, hosting a merchant's e-commerce (or online) store. The processing system 130, such as a payment processor, may be an intermediary in this system to ensure validity of a transaction request associated with the transaction vehicle 102.

Still referring to FIG. 1, the processing system 130 may include acquirer system(s) 132, switching system(s) 134, categorization system(s) 136, and authorization system(s) 138. The acquirer system(s) 132 may receive, from the POS terminal 110 and/or merchant system 120, a transaction request associated with the transaction vehicle 102. The transaction request may include, for example, a request to authorize a purchase/payment transaction. The acquirer system(s) 132 may include a standalone acquirer system and/or an integrated acquirer system that may be configured to receive transaction data from the merchant system(s) 120. The acquirer system(s) 132 may determine whether the transaction vehicle 102 is a filtered transaction vehicle or a non-filtered transaction vehicle. The acquirer system(s) 132 may communicate with the issuer system(s) 170 and the transaction network(s) 160 to complete the transaction request. Further, the acquirer system(s) 132 may, via the switching system(s) 134, transmit the transaction request to the categorization system(s) 136 and/or the authorization system(s) 138. The categorization system(s) 136 may analyze and/or categorize the transaction data associated with (e.g., included in) the received transaction request. The categorization system(s) 136 may then transmit the analyzed and/or categorized transaction data to the authorization system(s) 138. The authorization system(s) 138 may then communicate with the issuer system(s) 170 and/or the transaction network(s) 160 to complete the transaction request.

Figure 2:
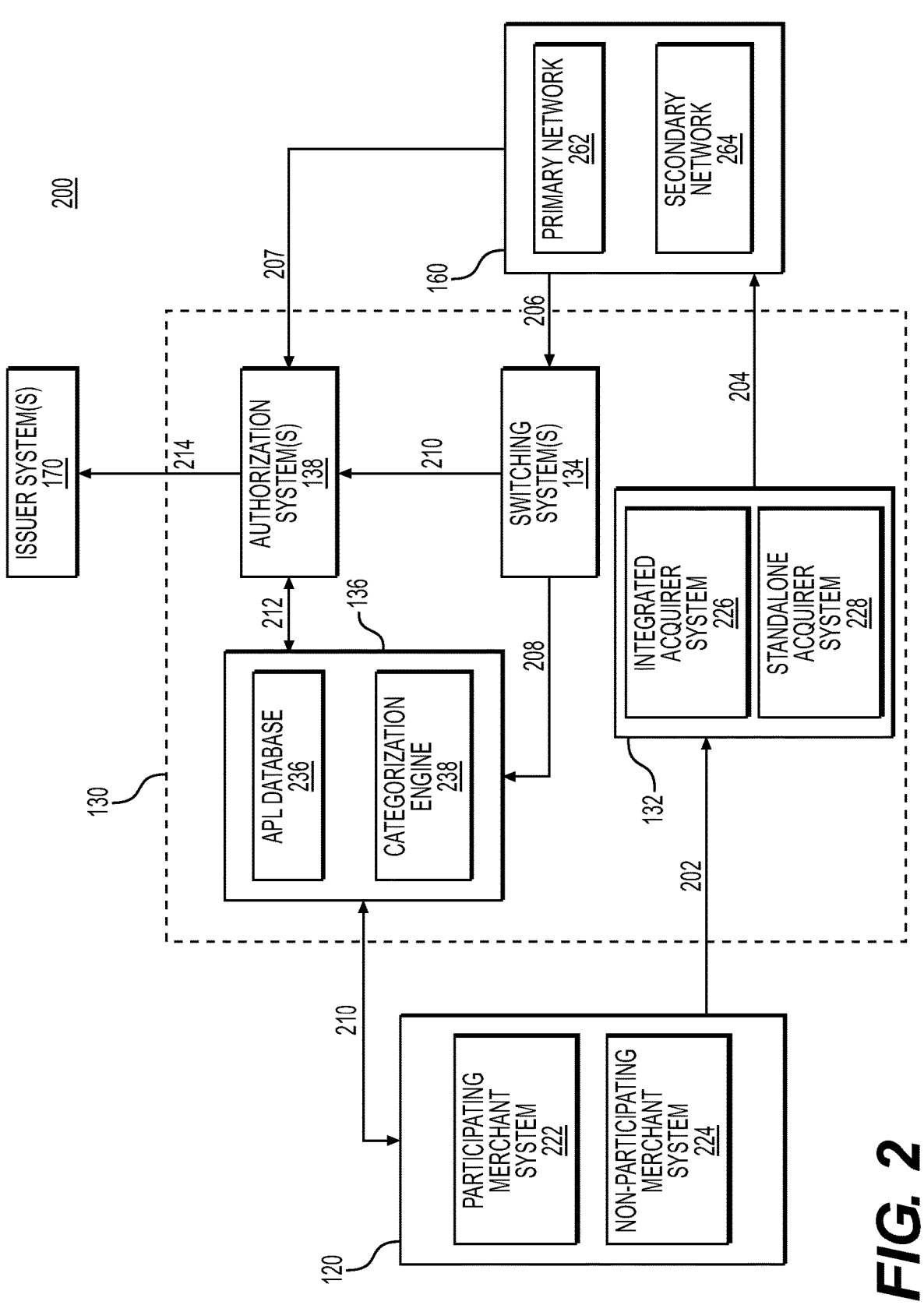
FIG. 2 depicts a block diagram of an exemplary filtered transaction process, according to one aspect of the present disclosure.

FIG. 2 shows a filtered transaction process 200 in accordance with one or more embodiments of this disclosure. Further, FIG. 2 depicts a more detailed example illustration of the system 100, but should not be construed as limiting the system 100. The merchant system(s) 120 may include a participating merchant system 222 and/or a non-participating merchant system 224. As described above, the participating merchant system 222 may utilize a standalone filtered transaction terminal (e.g., a standalone EBT terminal) or other integrated POS terminals that may be configured to accept the filtered transaction vehicles of this disclosure. For example, the participating merchant system 222 may utilize an integrated POS system (or terminal) to communicate with the acquirer system(s) 132 by using, for example, one or more third-party POS terminals. The one or more third-party POS terminals may be communicatively connected to one or more gateways to facilitate communication with the acquirer system(s) 132. In one embodiment, the participating merchant system 222 may communicate, via the one or more gateways, with an integrated acquirer system 226 of the acquirer system(s) 132. Additionally or alternatively, the participating merchant system 222 utilizing a standalone filtered transaction terminal (e.g., filtered EBT system) may communicate with a standalone acquirer system 228 of the acquirer system(s) 132 to facilitate one or more electronic transactions (e.g., a purchase transaction) of this disclosure.

In one embodiment, at step 202, the participating merchant system 222 may transmit, for example, via an integrated POS system and/or a standalone EBT system, a transaction request including transaction data (e.g., purchase data associated with a filtered transaction vehicle) associated with the transaction vehicle 102 (e.g., a filtered transaction vehicle) to the acquirer system(s) 132 (e.g., integrated acquirer system 226 or standalone acquirer system 228). In some embodiments, the merchant system(s) 120 may transmit the transaction request to the acquirer system(s) 132 following the International Standard Organization (ISO) format (e.g., ISO 8583-bit elements 105, 106, 107, and/or 108 in a 0200 Financial message). Additionally or alternatively, the merchant system(s) 120 may transmit the transaction request to the acquirer system(s) 132 via one or more Application Programming Interface (API) messages. The transaction data of the transaction request may include, for example, "enhanced" data. In one embodiment, the enhanced data may include, for example, Stock Keeping Unit (SKU) level data (or full cart data). A stock keeping unit may be a unique identifier for an item sold or provided by a merchant or a filtered transaction participating entity. In some embodiments, the enhanced data may be required to facilitate the filtered transaction process of this disclosure. The acquirer system(s) 132 may detect or determine whether or not the transaction data received from the merchant system(s) 120 includes the required enhanced data.

Still referring to FIG. 2, at step 204, upon determining whether the transaction data includes enhanced data, the acquirer system(s) 132 may transmit the transaction request to a primary network 262 or a secondary network 264. For example, if the transaction data includes enhanced data (e.g., SKU level data), the acquirer system(s) 132 may transmit the transaction request to the primary network 262 (e.g., NYCE network). At step 206, the primary network 262 may then transmit the transaction request with the enhanced data to the switching system(s) 134. If the transaction data does not include any enhanced data, the acquirer system(s) 132 may transmit the transaction request to the secondary network 264 (e.g., Visa, MasterCard, Discover, American Express, other regional networks, etc.). At step 207, the secondary network 264 may transmit the transaction request without enhanced data directly, for example, without routing the transaction request to the switching systems(s) 134, to the authorization system(s) 138 to complete the transaction request with the issuer system(s) 170.

In some embodiments, at step 202, the non-participating merchant system 224 may communicate with the acquirer system(s) 132 to facilitate one or more electronic transactions (e.g., purchase transactions) in accordance with this disclosure. Additionally or alternatively, the non-participating merchant system 224 may communicate with other acquirer systems that may be communicatively connected to the processing system(s) 130 and/or the acquirer system(s) 132 to facilitate one or more electronic transactions associated with the transaction vehicle 102. In one embodiment, the non-participating merchant system 224 may request to participate in one or more aspects of the filtered transaction process of this disclosure. However, the non-participating merchant system 224 may not be configured to transmit the required enhanced data (e.g., SKU level data) to the acquirer system(s) 132. In this embodiment, the non-participating merchant system 224 may transmit self-categorized data (or lite-enhanced data), along with the transaction request, to the acquirer system(s) 132. The self-categorized data may be data categorized by the non-participating merchant system 224 that correspond to one more items carried or provided by the non-participating merchant system 224. The self-categorized data may include one or more filtered items that may correspond with categorization data stored in the categorization system(s) 136. In one embodiment, the acquirer system(s) 132 may transmit the transaction request including the self-categorized data to the primary network 262 (e.g., NYCE network) or the secondary network 264 (e.g., MasterCard network). The primary network 262 or the secondary network 264 may then transmit the transaction request including the self-categorized data to the switching system(s) 134 at step 206 or the authorization system(s) 138 at step 207. The authorization system(s) 138 may then communicate with the categorization system(s) 136 to verify the self-categorized data and complete the transaction request with the issuer system(s) 170.

Still referring to FIG. 2, the switching system(s) 134 may determine whether the transaction request received from the primary network 262 includes enhanced data, lite-enhanced data, or non-enhanced data. If the transaction request includes lite-enhanced data or non-enhanced data, the switching system(s) 134 may transmit the transaction request to the authorization system(s) 138 to complete the transaction request with the issuer system(s) 170. If the transaction request includes enhanced data (e.g., SKU level data), the switching system(s) 134 may transmit the transaction request with the enhanced data to the categorization system(s) 136. In one embodiment, the categorization system(s) 136 may include an approved product list (APL) database 236 and a categorization engine 238. The APL database 236 may store one or more APL lists associated with the participating merchant system 222, non-participating merchant system 224, the transaction vehicle 102 (e.g., a filtered transaction card), and/or one or more filtered transaction participating entities (e.g., a merchant, a bank, a company, a government agency, etc.).

In one embodiment, the categorization system(s) 136 may manage the contents of the APL lists stored in the APL database 236. The APL lists may include, for example, approved Universal Product Codes (UPC), Price Look-Up (PLU) codes, comparable product identifiers (e.g., maker codes), and/or cross references to categories of products identified by the system 100. A participating merchant, or any filtered transaction participating entities, may add filtered items to, remove filtered items from, or re-categorize an APL list via one or more interfaces. In one embodiment, a single item may be associated with a single category on a given APL list. Additionally, a card bank identification number (BIN) of a filtered transaction vehicle (e.g., the transaction vehicle 102) may be associated with one or more specific APL lists. The categorization system(s) 136 may also provide one or more APL lists to the merchants who may request to self-categorize and/or organize the categorization data. In one embodiment, the categorization system(s) 136 may be configured to provide one or more APIs which may be utilized by one or more merchants or entities that may participate in the filtered transaction process of this disclosure. The one or more APIs may be configured to respond to a user inquiry (e.g., item identification by scanning a UPC code by a client, a client app utilizing the API to lookup whether an item is covered by the filtered transaction process, etc.).

Still referring to FIG. 2, the categorization engine 238 may receive the transaction request from the switching system(s) 134 and categorize one or more items identified in the transaction request at step 208. The categorization engine 238 may identify category and subcategory values associated with the one or more items identified in a transaction request by checking against an appropriate APL file associated with the transaction request. In one embodiment, one APL file may contain, for example, up to 300,000 category entries. Additionally, the categorization engine 238 may provide a summary of items under different categories. For example, an APL file may map items to one or more benefit purses (i.e., benefit accounts) associated with a filtered transaction vehicle (e.g., transaction vehicle 102). For example, the one or more benefit purses may include a Healthy Food Choice (HFC) purse, an Over the Counter (OTC) purse, and/or an Other (OTH) purse. The one or more benefit purses may include prefunded balances provided by a participating entity of the filtered transaction of this disclosure. Of course, any other suitable purses may be identified and established based on the products and items associated with merchants or entities that may participate in the filtered transaction.

In one embodiment, the categorization engine 238 may utilize identification data (e.g., a BIN value) of a filtered transaction vehicle to associate one or more items (e.g., UPC/PLU items) identified in a transaction request with the APL files or lists. The categorization engine 238 may then determine a category or a subcategory and a benefit purse type information for each UPC/PLU item identified in the transaction request. The categorization engine 238 may then create a summary of total amounts allocated among one or more benefit purse types (e.g., HFC purse, OTC purse, and/or OTH purse). In one embodiment, the categorization engine 238 may categorize and summarize the items that are not identified in the APL list as the OTH purse. Additionally, for any errors associated with the categorization process of this disclosure, all of the identified amounts may be categorized as the OTH purse, since categorization may not have occurred. As such, one or more purses associated with a filtered transaction vehicle may be utilized to purchase various items that may be eligible for the filtered transaction in accordance with this disclosure.

Still referring to FIG. 2, the categorization system(s) 136 may transmit a result of the categorization to the authorization system(s) 138 at step 212. That is, the categorization system(s) 136 may generate a categorization response based on the one or more items of the transaction request that are categorized by the categorization engine 238. For example, the categorization response may include the categorization of eligible items into the HFC purse, the OTC purse, and/or the OTH purse. Items that are not eligible for a filtered transaction (e.g., items categorized in the OTH purse) may be categorized in a generic spending purse of the filtered transaction vehicle. In one embodiment, a generic spending purse may be any suitable bank or credit card account associated with the filtered transition vehicle. At step 214, the authorization system(s) 138 may communicate with the issuer system(s) 170 to complete the transaction request initially transmitted from the merchant system(s) 120. For example, based on the categorization of the items identified in the transaction request, prepaid balances or bank or credit card balances associated with the filtered transaction vehicle may be deducted or updated accordingly. The filtered transaction process of this disclosure may offer participants such as employers, consumer brands, healthcare, or insurance companies the means to encourage spending for specific purchases. That is, a beneficiary (e.g., a cardholders may utilize the filtered transaction vehicle (e.g., prepaid card) to purchase items, such as, for example, over the counter medications (e.g., cough syrup, aspirin, bandages, etc.) as part of a corporate benefit or consumer brand incentive. Other use cases may include specific health food options, allowing cardholders to receive discounts on specific purchases contributing to overall health. Further, at step 210, the categorization system 136 may allow the participating entities to categorize filtered items into categories, update categories in APL files, track individual product items identified in transaction requests, and perform reporting and analysis of the filtered items listed in the APL files and associated transaction requests. In one embodiment, the SKU level data in the enhanced data of a transaction request may be utilized to check and update the availability of one or more filtered items in the APL files.

Figure 3:
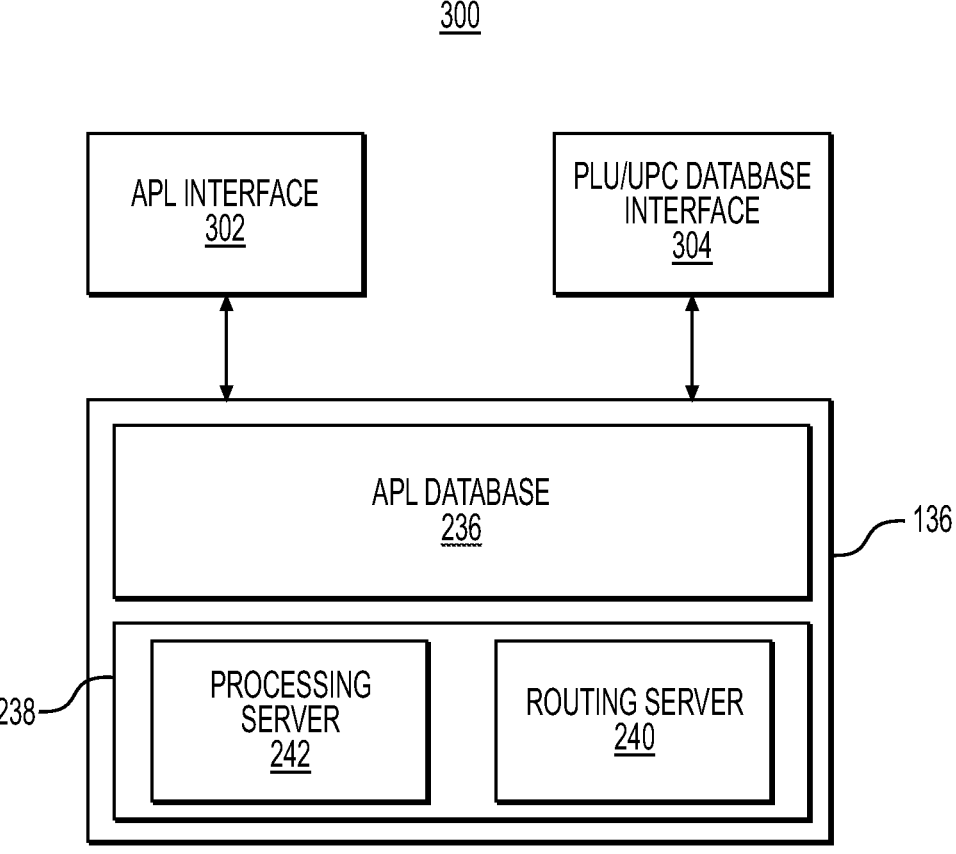
FIG. 3 depicts a block diagram of another exemplary filtered transaction system, according to one aspect of the present disclosure.

FIG. 3 shows an example system 300 in accordance with one or more embodiments of this disclosure. Particularly, FIG. 3 depicts a more detailed example illustration of the categorization system(s) 136, but should not be construed as limiting the categorization system(s) 136 or the system 100. The categorization system(s) 136 may include the APL database 236 and the categorization engine 238. The categorization system 136 may be communicatively connected to an APL interface 302 and a PLU/UPC database interface 304.

In one embodiment, the categorization engine 238 may include one or more servers. For example, the categorization engine 238 may include a routing server 240 and a processing server 242. In one embodiment, the routing server 240 may route a categorization request (or transaction request) received from the switching system(s) 134 to the processing server 242. In one embodiment, the processing server 242 may categorize one or more items associated with the categorization request (e.g., from ISO 8583 data elements 105 thru 108) to identify category and subcategory values associated with the one or more items of the categorization request by checking against appropriate APL files. The processing server 242 may communicate with the routing server 240 and the APL database 236 to execute the categorization process in accordance with the process 200 of FIG. 2 described above.

Still referring to FIG. 3, in one embodiment, the APL interface 302 may be configured to communicate with the categorization system(s) 136 to access one or more APL files in the APL database 236. The APL interface 302 may be provided as an app or a web service. The APL interface 302 may allow a user, merchant, or customer to access the APL files to check whether or not a particular item or product is being offered or provided by filtered transaction participants (e.g., vendors, employers, consumer brands, healthcare, insurance companies, etc.). In one embodiment, the PLU/UPC database interface 304 may be configured to communicate with the categorization system(s) 136 to access one or more APL files including PLU/UPC data associated with items or products offered by a filtered transaction participant of this disclosure. For example, the filtered transaction participants (e.g., vendors, employers, consumer brands, healthcare, insurance companies, etc.) may utilize the PLU/UPC database interface 304 to review, track, and/or update the UPC/PLU data. For example, the filtered transaction participants of this disclosure may add or update information associated with a UPC/PLU item (e.g., descriptions of entry such as nutritional information, images, size, etc.).

FIG. 4 depicts a flowchart of an exemplary method 400 for executing a filtered transaction using the systems and processes of FIGS. 1-3, according to one aspect of this disclosure. In one embodiment, the method 400 may be executed by the system 100.

At step 402, an acquirer system of a filtered processing system (e.g., acquirer system(s) 132) may receive a transaction request comprising transaction data from a merchant system (e.g., merchant system(s) 120), the transaction data comprising enhanced data or non-enhanced data. In one embodiment, the transaction data may be generated upon a payment vehicle being provided at the merchant system, the payment vehicle comprising a prefunded credit card or an Electronic Benefits Transfer (EBT) card. At step 404, the acquirer system may determine a status of the merchant system based on the transaction data, the status of the merchant system indicative of a participating status or a non-participating status. At step 406, upon determining the status of the merchant system indicative of the participating status, the acquirer system may transmit the transaction request to a first transaction network (e.g., primary network 262). The first transaction network may forward the transaction request to a categorization engine of the filtered transaction processing system. On the other hand, upon determining the status of the merchant system indicative of the non-participating status, the acquirer system may transmit the transaction data request to a second transaction network (e.g., secondary network 264) at step 412.

At step 408, the categorization engine, using the transaction data, may categorize one or more items associated with the transaction request into one or more categories. In one embodiment, the one or more items may be categorized based at least on one or more approved product lists stored in a database (e.g., APL database 236) of the filtered transaction processing system. Further, the one or more categories may include at least one of a medical expenditure, a food expenditure, an excluded expenditure, or an unknown expenditure. In one embodiment, the categorization engine may determine a filtered transaction eligibility of each of the one or more items at least based on one or more approved product lists stored in a database of the filtered transaction processing system.

At step 410, the filtered transaction processing system may execute the transaction request based on the one or more categories. In one embodiment, the filtered transaction processing system may execute the transaction request of the payment vehicle by communicating with an issuer system to settle transaction amounts from one or more accounts. Each of the one or more accounts may correspond to a respective one of the one or more categories.

The systems and methods of the present disclosure described herein may utilize a software development kit (SDK) server (not shown) that may provide various SDK functions (or SDK) that the merchant system(s) 120, the POS terminal 110, and the processing system 130. The SDK functions may be utilized to configure the merchant system(s) 120, the POS terminal 110, and the processing system 130 to facilitate communication between each other and to execute the electronic transactions of the present disclosure. In some embodiments, one or more features of the categorization engine 238 may be provided as an SDK. Further, the merchant system(s) 120, the POS terminal 110, and the processing system 130 may utilize an application programming interface (API) server (not shown) that may provide various APIs to facilitate communication between each other and to execute the electronic transactions of the present disclosure. The systems, processes, and methods of the present disclosure solve the technological problems arising in the conventional electronic transaction technology (e.g., EBT transactions). That is, the systems, processes, and methods of the present disclosure described herein are directed to an improvement in the conventional electronic transaction technical field and are practically applicable to the field of executing filtered electronic transactions by utilizing the categorization system(s) 136 of the processing system 130 contemplated herein.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 5:
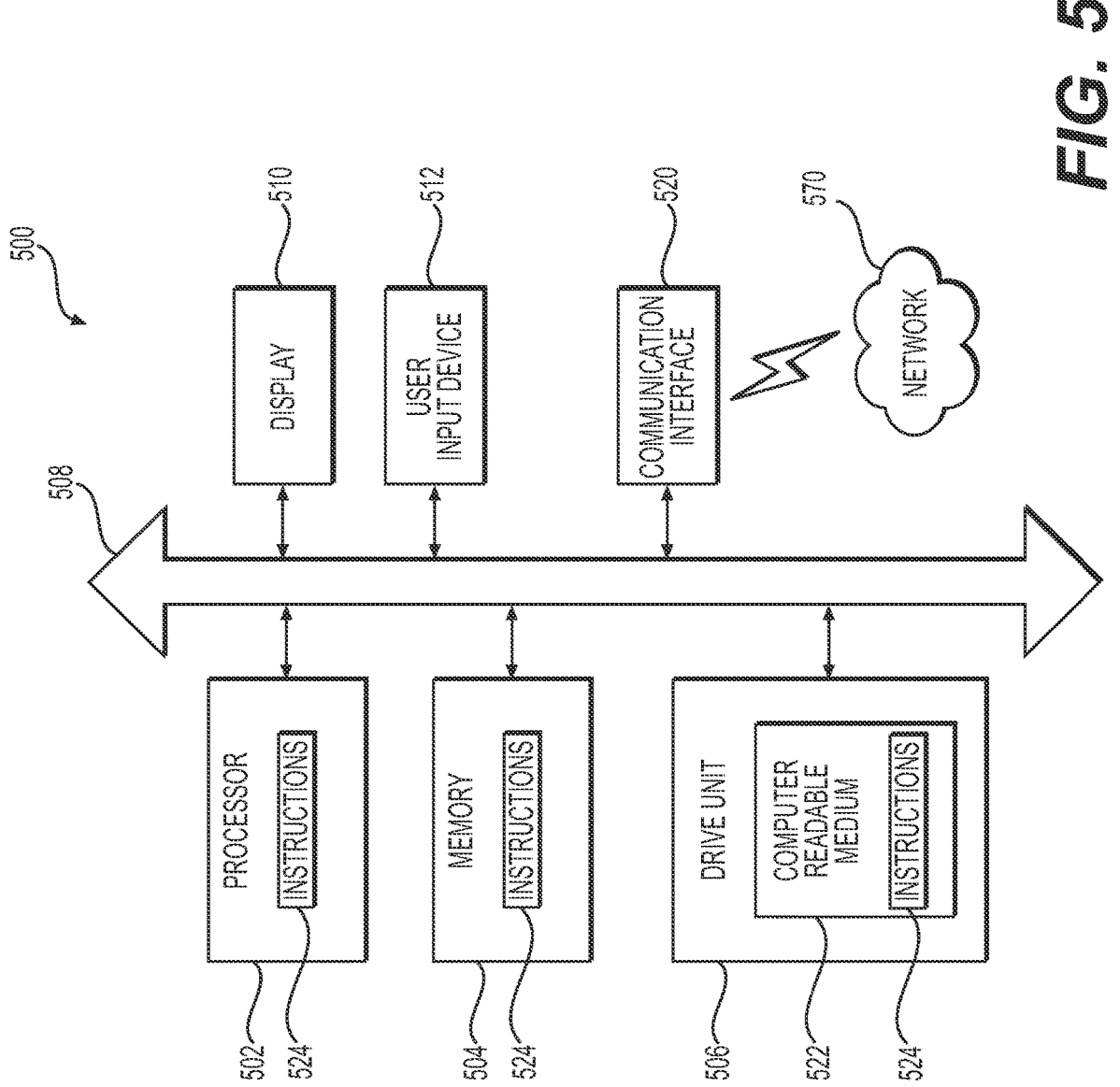
FIG. 5 illustrates a computer system for executing the techniques described herein.

FIG. 5 illustrates a computer system designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 500 can be implemented using electronic devices that provide voice, video, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel payment and the like.

As shown, the computer system 500 may further include a display unit 510, such as a liquid crystal display (LCD), an organic light emitting diode (OLED), a flat panel display, a solid-state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive unit 506.

Additionally or alternatively, the computer system 500 may include an input device 512 configured to allow a user to interact with any of the components of system 500. The input device 512 may be a number pad, a keyboard, or a cursor control device, such as a mouse, or a joystick, touch screen display, remote control, or any other device operative to interact with the computer system 500.

The computer system 500 may also or alternatively include a disk or optical drive unit 506. The disk drive unit 506 may include a computer-readable medium 522 in which one or more sets of instructions 524, e.g., software, can be embedded. Further, the instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, a computer-readable medium 522 includes instructions 524 or receives and executes instructions 524 responsive to a propagated signal so that a device connected to a network 570 can communicate voice, video, audio, images, or any other data over the network 570. Further, the instructions 524 may be transmitted or received over the network 570 via a communication port or interface 520, and/or using a bus 508. The communication port or interface 520 may be a part of the processor 502 or may be a separate component. The communication port 520 may be created in software or may be a physical connection in hardware. The communication port 520 may be configured to connect with a network 570, external media, the display 510, or any other components in system 500, or combinations thereof. The connection with the network 570 may be a physical connection, such as a wired Ethernet connection or may be established wirelessly as discussed below. Likewise, the additional connections with other components of the system 500 may be physical connections or may be established wirelessly. The network 570 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 522 may be non-transitory, and may be tangible.

The computer-readable medium 522 can include a solid-state memory such as a memory card or other package that houses one or more non-volatile read-only memories. The computer-readable medium 522 can be a random-access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 500 may be connected to one or more networks 570. The network 570 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 570 may include wide area networks (WAN), such as the Internet, local area networks (LAN), campus area networks, metropolitan area networks, a direct connection such as through a Universal Serial Bus (USB) port, or any other networks that may allow for data communication. The network 570 may be configured to couple one computing device to another computing device to enable communication of data between the devices. The network 570 may generally be enabled to employ any form of machine-readable media for communicating information from one device to another. The network 570 may include communication methods by which information may travel between computing devices. The network 570 may be divided into sub-networks. The sub-networks may allow access to all of the other components connected thereto or the sub-networks may restrict access between the components. The network 570 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method comprising:

receiving, by an acquirer server of a filtered transaction processing server via one or more processors, a transaction request comprising transaction data from a merchant server, wherein the transaction data comprises enhanced data including stock keeping unit (SKU) level data, wherein a point of service (POS) terminal communicatively connected to one or more gateways collects the transaction data and transmits the transaction data to the merchant server, and wherein the merchant server transmits the transaction data in a specific format to the acquirer server via one or more application programming interface (API) servers utilizing the one or more gateways;

processing, by the acquirer server via the one or more processors, the transaction data to determine whether: (i) a status of a merchant of the merchant server is indicative of a participating status or a non-participating status to a service and (ii) a transaction vehicle associated with the transaction data is a filtered transaction vehicle or a non-filtered transaction vehicle;

determining, by the acquirer server via the one or more processors, the status of the merchant is indicative of the participating status to the service and the transaction vehicle is the filtered transaction vehicle, based on the enhanced data in the transaction data, the enhanced data including the SKU level data for one or more items associated with the transaction request;

transmitting, by the acquirer server via the one or more processors, the transaction request to a first transaction network of one or more transaction networks, wherein the first transaction network processes the transaction data to determine subsequent routing of the transaction request;

transmitting, by the first transaction network via the one or more processors, the transaction request to a switching server, wherein the switching server further processes the transaction data to transmit the transaction request to a categorization engine;

transmitting, by the switching server via the one or more processors, the transaction request to the categorization engine, wherein the categorization engine analyzes the transaction data for determining eligibility of the one or more items for categorization, and wherein the categorization engine dynamically adjusts pre-defined rules for categorization based on feedback from participating servers;

categorizing, by the categorization engine via the one or more processors, in real-time, the one or more items associated with the transaction request into one or more categories based on the enhanced data and provides a summary for each of the categorized items, and wherein the categorization engine identifies category and subcategory values associated with the one or more items by checking, in real-time, the SKU level data in the enhanced data and an approved product list associated with the transaction request stored in a database;

mapping, by the categorization engine via the one or more processors, each of the categorized items to one or more benefit accounts associated with the filtered transaction vehicle based on their attributes;

determining, by the categorization engine via the one or more processors, values for each of the mapped items and one or more unmapped items;

transmitting, by the categorization engine via the one or more processors, the transaction request based on the one or more categories to an authorization server, wherein the authorization server verifies the categorized items and communicates with an issuer server to complete the transaction request by allocating an amount equivalent to the determined values for each of the mapped items to the one or more benefit accounts;

settling, by the acquirer server via the one or more processors, value of each of the mapped items from the one or more benefit accounts associated with the filtered transaction vehicle;

settling, by the acquirer server via the one or more processors, value of the one or more unmapped items from a general account associated with the filtered transaction vehicle;

generating, via an interface of a display unit of a device associated with the merchant utilizing the one or more processors, a presentation of the categorized items associated with the transaction request, wherein the display unit communicates, via an encrypted network, with the categorization engine to access the approved product list stored in the database, and wherein the merchant interacts with the interface of the display unit to review, track, and update information associated with the categorized items in the approved product list;

determining, at the acquirer server, that a status of a second merchant is non-participating to the service;

transmitting, by the acquirer server, a second transaction request from the second merchant to a second transaction network of the one or more transaction networks, wherein the second transaction network is configured to process transaction data from the second merchant to determine that one or more items from the second transaction request are on the approved product list;

displaying on the display the one or more items from the second transaction request are on the approved list; and sending a command, by the acquirer server, to the second merchant authorizing the second transaction request including the one or more items.

2. The method of claim 1, wherein transmission of the transaction request by the first transaction network to the switching server, further comprising:

determining, by the first transaction network, whether the transaction request includes the SKU level data for the one or more items; and transmitting, by the first transaction network, the transaction request to the switching server upon determining the transaction request includes the SKU level data.

3. The method of claim 1, wherein the one or more categories comprise at least one of a medical expenditure, a food expenditure, an excluded expenditure, or an unknown expenditure.

4. The method of claim 1, wherein the transaction data is generated upon the transaction vehicle being provided at the POS terminal, the transaction vehicle comprising a prefunded credit card or an Electronic Benefits Transfer (EBT) card.

5. The method of claim 1, further comprising:

determining, by the categorization engine, a filtered transaction eligibility of each of the one or more items based at least on one or more approved product lists stored in the database of the filtered transaction processing server.

6. A system comprising:

one or more computer readable media storing instructions; and one or more processors configured to execute the instructions to perform operations comprising:

receiving, by an acquirer server of a filtered transaction processing server via the one or more processors, a transaction request comprising transaction data from a merchant server, wherein the transaction data comprises enhanced data including stock keeping unit (SKU) level data, wherein a point of service (POS) terminal communicatively connected to one or more gateways collects the transaction data and transmits the transaction data to the merchant server, and wherein the merchant server transmits the transaction data in a specific format to the acquirer server via one or more application programming interface (API) servers utilizing the one or more gateways;

processing, by the acquirer server via the one or more processors, the transaction data to determine whether: (i) a status of a merchant of the merchant server is indicative of a participating status or a non-participating status to a service and (ii) a transaction vehicle associated with the transaction data is a filtered transaction vehicle or a non-filtered transaction vehicle;

determining, by the acquirer server via the one or more processors, the status of the merchant is indicative of the participating status to the service, the transaction vehicle is the filtered transaction vehicle, and the transaction data includes unique identifiers for one or more items associated with the transaction request;

transmitting, by the acquirer server via the one or more processors, the transaction request to a first transaction network of one or more transaction networks, wherein the first transaction network processes the transaction data to determine subsequent routing of the transaction request;

transmitting, by the first transaction network via the one or more processors, the transaction request to a switching server, wherein the switching server further processes the transaction data to transmit the transaction request to a categorization engine;

transmitting, by the switching server via the one or more processors, the transaction request to the categorization engine, wherein the categorization engine analyzes the transaction data for determining eligibility of the one or more items for categorization, and wherein the categorization engine dynamically adjusts pre-defined rules for categorization based on feedback from participating servers;

categorizing, by the categorization engine via the one or more processors, in real-time, the one or more items associated with the transaction request into one or more categories based on the enhanced data and provides a summary for each of the categorized items, and wherein the categorization engine identifies category and subcategory values associated with the one or more items by checking, in real-time, the SKU level data in the enhanced data and an approved product list associated with the transaction request stored in a database;

mapping, by the categorization engine via the one or more processors, each of the categorized items to one or more benefit accounts associated with the filtered transaction vehicle based on their attributes;

determining, by the categorization engine via the one or more processors, values for each of the mapped items and one or more unmapped items;

transmitting, by the categorization engine via the one or more processors, the transaction request based on the one or more categories to an authorization server, wherein the authorization server verifies the categorized items and communicates with an issuer server to complete the transaction request by allocating an amount equivalent to the determined values for each of the mapped items to the one or more benefit accounts;

settling, by the acquirer server via the one or more processors, value of each of the mapped items from the one or more benefit accounts associated with the filtered transaction vehicle;

settling, by the acquirer server via the one or more processors, value of the one or more unmapped items from a general account associated with the filtered transaction vehicle;

generating, via an interface of a display unit of a device associated with the merchant utilizing the one or more processors, a presentation of the categorized items associated with the transaction request, wherein the display unit communicates, via an encrypted network, with the categorization engine to access the approved product list stored in the database, and wherein the merchant interacts with the interface of the display unit to review, track, and update information associated with the categorized items in the approved product list;

determining, at the acquirer server, that a status of a second merchant is non-participating to the service;

transmitting, by the acquirer server, a second transaction request from the second merchant to a second transaction network of the one or more transaction networks, wherein the second transaction network is configured to process transaction data from the second merchant to determine that one or more items from the second transaction request are on the approved product list, such that the display displays the one or more items from the second transaction are on the approved list; and sending a command, by the acquirer server, to the second merchant authorizing the second transaction request including the one or more items.

7. The system of claim 6, wherein transmission of the transaction request by the first transaction network to the switching server, further comprising:

determining, by the first transaction network, whether the transaction request includes the SKU level data for the one or more items; and transmitting, by the first transaction network, the transaction request to the switching server upon determining the transaction request includes the SKU level data.

8. The system of claim 6, wherein the one or more categories comprise at least one of a medical expenditure, a food expenditure, an excluded expenditure, or an unknown expenditure.

9. The system of claim 6, wherein the transaction data is generated upon the transaction vehicle being provided at the POS terminal, the transaction vehicle comprising a prefunded credit card or an Electronic Benefits Transfer (EBT) card.

10. The system of claim 6, the operations further comprising:

determining, by the categorization engine, a filtered transaction eligibility of each of the one or more items based at least on one or more approved product lists stored in the database of the filtered transaction processing server.

11. A non-transitory computer-readable medium storing instructions, the instructions, when executed by one or more processors, causing the one or more processors to perform operations comprising:

receiving, by an acquirer server of a filtered transaction processing server via the one or more processors, a transaction request comprising transaction data from a merchant server, wherein the transaction data comprises enhanced data including stock keeping unit (SKU) level data, wherein a point of service (POS) terminal communicatively connected to one or more gateways collects the transaction data and transmits the transaction data to the merchant server, and wherein the merchant server transmits the transaction data in a specific format to the acquirer server via one or more application programming interface (API) servers utilizing the one or more gateways;

processing, by the acquirer server via the one or more processors, the transaction data to determine whether: (i) a status of a merchant of the merchant server is indicative of a participating status or a non-participating status to a service and (ii) a transaction vehicle associated with the transaction data is a filtered transaction vehicle or a non-filtered transaction vehicle;

determining, by the acquirer server via the one or more processors, the status of the merchant is indicative of the participating status to the service and the transaction vehicle is the filtered transaction vehicle, based on the enhanced data in the transaction data, the enhanced data including the SKU level data for one or more items associated with the transaction request;

transmitting, by the acquirer server via the one or more processors, the transaction request to a first transaction network of one or more transaction networks, wherein the first transaction network processes the transaction data to determine subsequent routing of the transaction request;

transmitting, by the first transaction network via the one or more processors, the transaction request to a switching server, wherein the switching server further processes the transaction data to transmit the transaction request to a categorization engine;

transmitting, by the switching server via the one or more processors, the transaction request to the categorization engine, wherein the categorization engine analyzes the SKU level data in the enhanced data for determining eligibility of the one or more items for categorization, and wherein the categorization engine dynamically adjusts pre-defined rules for categorization based on feedback from participating servers;

categorizing, by the categorization engine via the one or more processors, in real-time, the one or more items associated with the transaction request into one or more categories based on the enhanced data and provides a summary for each of the categorized items, and wherein the categorization engine identifies category and subcategory values associated with the one or more items by checking, in real-time, the SKU level data in the enhanced data and an approved product list associated with the transaction request stored in a database;

mapping, by the categorization engine via the one or more processors, each of the categorized items to one or more benefit accounts associated with the filtered transaction vehicle based on their attributes;

determining, by the categorization engine via the one or more processors, values for each of the mapped items and one or more unmapped items;

transmitting, by the categorization engine via the one or more processors, the transaction request based on the one or more categories to an authorization server, wherein the authorization server verifies the categorized items and communicates with an issuer server to complete the transaction request by allocating an amount equivalent to the determined values for each of the mapped items to the one or more benefit accounts;

settling, by the acquirer server via the one or more processors, value of each of the mapped items from the one or more benefit accounts associated with the filtered transaction vehicle;

settling, by the acquirer server via the one or more processors, value of the one or more unmapped items from a general account associated with the filtered transaction vehicle;

generating, via an interface of a display unit of a device associated with the merchant utilizing the one or more processors, a presentation of the categorized items associated with the transaction request, wherein the display unit communicates, via an encrypted network, with the categorization engine to access the approved product list stored in the database, and wherein the merchant interacts with the interface of the display unit to review, track, and update information associated with the categorized items in the approved product list;

determining, at the acquirer server, that a status of a second merchant is non-participating to the service;

transmitting, by the acquirer server, a second transaction request from the second merchant to a second transaction network of the one or more transaction networks, wherein the second transaction network is configured to process transaction data from the second merchant to determine that one or more items from the second transaction request are on the approved product list;

displaying on the display the one or more items from the second transaction request are on the approved list; and sending a command, by the acquirer server, to the second merchant authorizing the second transaction request including the one or more items.

12. The non-transitory computer-readable medium of claim 11, wherein transmission of the transaction request by the first transaction network to the switching server, further comprising:

determining, by the first transaction network, whether the transaction request includes the SKU level data for the one or more items; and transmitting, by the first transaction network, the transaction request to the switching server upon determining the transaction request includes the SKU level data.

13. The non-transitory computer-readable medium of claim 11, the operations further comprising:

determining, by the categorization engine, a filtered transaction eligibility of each of the one or more items based at least on one or more approved product lists stored in the database of the filtered transaction processing server.

14. The method of claim 1, wherein the categorization engine includes a routing server and a processing server, and wherein the routing server routes the transaction request received from the switching server to the processing server for categorizing the one or more items associated with the transaction request.

\* \* \* \* \*